United States Patent
Chen

(10) Patent No.: US 10,423,188 B1
(45) Date of Patent: Sep. 24, 2019

(54) VOLTAGE GENERATING CIRCUIT FOR IMPROVING STABILITY OF BANDGAP VOLTAGE GENERATOR

(71) Applicant: Faraday Technology Corp., Hsinchu (TW)

(72) Inventor: Jin-Sheng Chen, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 0 days.

(21) Appl. No.: 16/029,648

(22) Filed: Jul. 9, 2018

(30) Foreign Application Priority Data

Apr. 10, 2018 (TW) .............................. 107112327 A

(51) Int. Cl.
| | |
|---|---|
| *G05F 3/26* | (2006.01) |
| *G05F 3/24* | (2006.01) |
| *G05F 1/46* | (2006.01) |
| *H02M 1/00* | (2006.01) |
| *H02M 1/36* | (2007.01) |

(52) U.S. Cl.
CPC ................ *G05F 3/26* (2013.01); *G05F 1/468* (2013.01); *G05F 3/24* (2013.01); *G05F 3/242* (2013.01); *G05F 3/262* (2013.01); *H02M 1/36* (2013.01); *H02M 2001/0045* (2013.01)

(58) Field of Classification Search
CPC .. H02M 1/36; H02M 2001/0045; G05F 1/468
See application file for complete search history.

(56) References Cited

U.S. PATENT DOCUMENTS

| | | | | | |
|---|---|---|---|---|---|
| 5,448,159 | A | * | 9/1995 | Kojima ................... | G05F 3/262 323/313 |
| 5,512,816 | A | * | 4/1996 | Lambert ................. | G05F 3/265 323/315 |
| 5,646,518 | A | * | 7/1997 | Lakshmikumar ....... | G05F 3/267 323/316 |
| 5,672,993 | A | * | 9/1997 | Runaldue ................ | G05F 3/262 323/315 |
| 5,841,270 | A | * | 11/1998 | Do .......................... | G05F 3/245 323/314 |
| 6,016,050 | A | * | 1/2000 | Brokaw .................. | G05F 3/205 323/315 |
| 6,150,872 | A | * | 11/2000 | McNeill .................... | G05F 3/30 323/313 |

(Continued)

*Primary Examiner* — Yusef A Ahmed
*Assistant Examiner* — David A. Singh
(74) *Attorney, Agent, or Firm* — Winston Hsu

(57) ABSTRACT

In a voltage generating circuit, a bandgap voltage generator has a first operational amplifier to receive a first voltage and a second voltage, and generate a bias voltage by comparing the first voltage and the second voltage, wherein the bandgap voltage generator generates a bandgap current according to the bias voltage and generates an output voltage according to the bandgap current. In a start-up circuit, a comparison circuit compares the first voltage or the second voltage with a reference voltage to generate a first comparison result, and generates a first current according to the first comparison result. A voltage regulator generates a second current according to the first current, and compares the second current with a reference current to generate a second comparison result, and adjusts a voltage value of the bias voltage according to the second comparison result.

9 Claims, 3 Drawing Sheets

(56) References Cited

U.S. PATENT DOCUMENTS

| | | | | |
|---|---|---|---|---|
| 6,784,652 B1* | 8/2004 | Aude | | G05F 3/30 323/315 |
| 7,071,767 B2* | 7/2006 | Ou-yang | | G05F 3/30 327/539 |
| 7,253,598 B1* | 8/2007 | Doyle | | G05F 3/30 323/314 |
| 7,663,409 B2* | 2/2010 | Singnurkar | | G05F 1/561 323/313 |
| 7,768,343 B1* | 8/2010 | Sinitsky | | G05F 3/30 327/539 |
| 8,791,750 B2* | 7/2014 | Wada | | G05F 3/242 327/513 |
| 9,312,747 B1* | 4/2016 | Svorc | | H02M 1/36 |
| 9,600,013 B1* | 3/2017 | Liou | | G05F 3/262 |
| 9,780,652 B1* | 10/2017 | Far | | H02M 3/158 |
| 9,921,600 B1* | 3/2018 | Far | | G05F 3/262 |
| 2003/0201822 A1* | 10/2003 | Kang | | G05F 3/30 327/539 |
| 2004/0017248 A1* | 1/2004 | Ishida | | G05F 3/262 327/543 |
| 2006/0097774 A1* | 5/2006 | Hasegawa | | G05F 3/262 327/538 |
| 2008/0150594 A1* | 6/2008 | Taylor | | H03K 17/145 327/143 |
| 2008/0157746 A1* | 7/2008 | Chen | | G05F 3/30 323/313 |
| 2009/0085550 A1* | 4/2009 | Ide | | G05F 3/16 323/315 |
| 2009/0224819 A1* | 9/2009 | Shibata | | G05F 3/30 327/513 |
| 2010/0327844 A1* | 12/2010 | Ranjan | | G05F 3/262 323/315 |
| 2011/0304362 A1* | 12/2011 | Matsubara | | G05F 3/262 327/109 |
| 2012/0187930 A1* | 7/2012 | Williams | | G05F 1/5735 323/273 |
| 2012/0229202 A1* | 9/2012 | Nikolov | | G05F 1/56 327/564 |
| 2014/0003164 A1* | 1/2014 | Fifield | | G11C 8/08 365/189.09 |
| 2014/0015509 A1* | 1/2014 | Gupta | | G05F 3/30 323/313 |
| 2014/0232453 A1* | 8/2014 | Choi | | G05F 3/16 327/539 |
| 2015/0286240 A1* | 10/2015 | Whitten | | G05F 3/262 323/313 |
| 2016/0026204 A1* | 1/2016 | de Cremoux | | G05F 3/08 323/314 |
| 2017/0012609 A1* | 1/2017 | Shen | | G05F 3/267 |
| 2018/0032097 A1* | 2/2018 | Liou | | G05F 3/262 |

* cited by examiner

VOLTAGE GENERATING CIRCUIT FOR IMPROVING STABILITY OF BANDGAP VOLTAGE GENERATOR

CROSS-REFERENCE TO RELATED APPLICATION

This application claims the priority benefit of Taiwan application serial no. 107112327, filed on Apr. 10, 2018. The entirety of the above-mentioned patent application is hereby incorporated by reference herein and made a part of this specification.

BACKGROUND OF THE INVENTION

Field of the Invention

The invention relates to a voltage generating circuit, and particularly relates to a voltage generating circuit, which can effectively adjust a voltage value of a bias voltage outputted by a bandgap voltage generator.

Description of Related Art

In the conventional bandgap voltage generator, it is common to compare the voltage of the positive input end and the negative input end by using an operational amplifier, to generate a bias voltage. In addition, the bandgap voltage generator generates the bandgap current according to the bias voltage. It should be noted that, in the process of activating the bandgap voltage generator, if the voltage values on the positive input end and the negative input end of the operational amplifier are too low, the differential input circuit in the operational amplifier is thus shut, and the operational amplifier thus fails to provide an effective or normal bias voltage. Therefore, how to effectively adjust the voltage value of the bias voltage, and thus to improve the stability of the bandgap voltage generator is an important issue for people skilled in the art.

SUMMARY OF THE INVENTION

The invention provides a voltage generating circuit. By using a voltage regulator in a start-up circuit, a voltage value of a bias voltage output by an operational amplifier is adjusted, and the stability and accuracy of a bandgap voltage generator are thus improved.

The voltage generating circuit of the invention includes the bandgap voltage generator and the start-up circuit. The bandgap voltage generator has a first operational amplifier. The first operational amplifier receives a first voltage and a second voltage, and generates the bias voltage by comparing the first voltage and the second voltage, wherein the bandgap voltage generator generates a bandgap current according to the bias voltage, and generates an output voltage according to the bandgap current. The start-up circuit includes a comparison circuit and a voltage regulator. The comparison circuit compares the first voltage or the second voltage with a reference voltage to generate a first comparison result, and generates a first current according to the first comparison result, wherein the reference voltage is generated according to the first current. The voltage regulator is coupled to the comparison circuit and the bandgap voltage generator, generates a second current according to the first current, and compares the second current with the reference current to generate a second comparison result, and adjusts a voltage value of the bias voltage according to the second comparison result.

In view of the above, the voltage generating circuit of the invention, by using the voltage regulator in the start-up circuit, lowers the voltage value of the bias voltage output by the operational amplifier, and thus enhances the circuit value of the bandgap current. As such, the voltage generating circuit of the invention enhances the voltage value of the positive input end and the negative input end of the operational amplifier, to further improve the stability and the accuracy of the bandgap voltage generator.

To provide a further understanding of the aforementioned and other features and advantages of the disclosure, exemplary embodiments, together with the reference drawings, are described in detail below.

DESCRIPTION OF THE EMBODIMENTS

Figure 1:
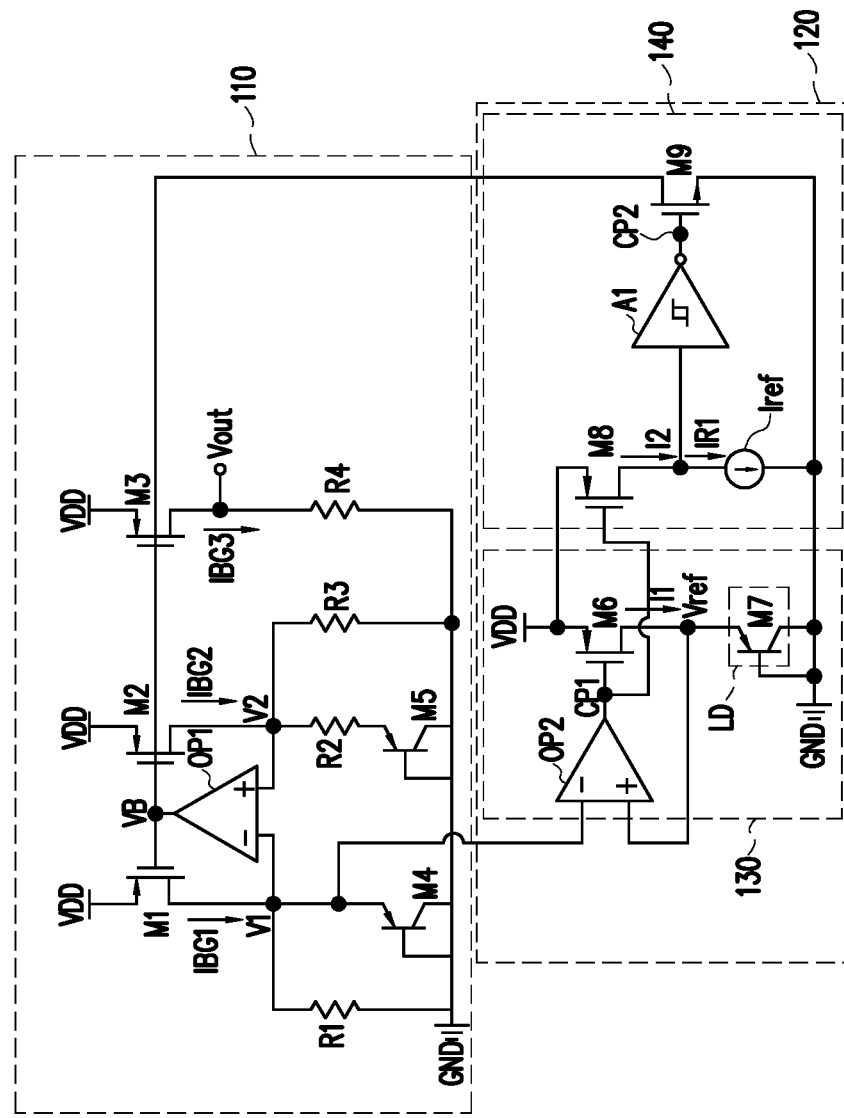
FIG. 1 is a circuit diagram of a voltage generating circuit according to an embodiment of the invention.

FIG. 1 is a circuit diagram of a voltage generating circuit according to an embodiment of the invention. A voltage generating circuit 100 includes a bandgap voltage generator 110 and a start-up circuit 120, wherein the bandgap voltage generator 110 includes an operational amplifier OP1, transistors M1-M5 and resistors R1-R4. In addition, the start-up circuit 120 includes a comparison circuit 130 and a voltage regulator 140. Specifically, in the bandgap voltage generator 110, a negative input end of the operational amplifier OP1 receives a voltage V1. A positive input end of the operational amplifier OP1 receives a voltage V2. In addition, the operational amplifier OP1 generates a bias voltage VB according to the comparison of the voltage V1 and the voltage V2. Besides, the bandgap voltage generator 110 generates bandgap currents IBG1-IBG3 and an output voltage Vout according to the bias voltage VB.

In the embodiment, a first end of the transistor M1 (for example, a source end) is coupled to a power voltage end VDD. A second end of the transistor M1 (for example, a drain end) is coupled to the negative input end the operational amplifier OP1. A control end of the transistor M1 (for example, a gate end) is controlled by the bias voltage VB. A first end of the transistor M2 (for example, a source end) is coupled to the power voltage end VDD. A second end of the transistor M2 (for example, a drain end) is coupled to the positive input end of the operational amplifier OP1. A control end of the transistor M2 (for example, a gate end) is controlled by the bias voltage VB. A first end of the transistor M3 (for example, a source end) is coupled to the power voltage end VDD. A second end of the transistor M3 (for example, a drain end) receives the output voltage Vout. A control end of the transistor M3 (for example, a gate end) is controlled by the bias voltage VB. A first end of the transistor M4 (for example, an emitter end) is coupled to the negative input end of the operational amplifier OP1. A second end (for example, a collector end) and a control end (for example, a base end) of the transistor M4 are both coupled to a reference ground end GND.

On the other hand, the resistor R1 is coupled between the negative input end of the operational amplifier OP1 and the reference ground end GND. A first end of the resistor R2 is coupled to the positive input end of the operational amplifier OP1. The resistor R3 is coupled between the positive input end of the operational amplifier OP1 and the reference ground end GND. The resistor R4 is coupled between the drain end of the transistor M3 and the reference ground end GND. A first end of the transistor M5 (for example, an emitter end) is coupled to a second end of the resistor R2. A second end (for example, a collector end) and a control end (for example, a base end) of the transistor M5 are both coupled to the reference ground end GND.

Notably, in the embodiment, the transistors M1-M3 may be P-type metal-oxide-semiconductor field-effect transistors (MOSFETs). The transistors M4-M5 may be PNP-type bipolar junction transistors (BJTs). However, the embodiment of the invention is not limited thereto.

It should be noted that the transistor M1 and the transistor M2 of the embodiment generate the corresponding bandgap current IBG1 and the bandgap current IBG2 according to the bias voltage VB. As such, the transistor M4 generates the voltage V1 according to the bandgap current IBG1 which flows through the transistor M4. The transistor M5 and the resistor R2 generate the voltage V2 according to the bandgap current IBG2 which flows through the transistor M5. The operational amplifier OP1 generates the bias voltage VB according to the different value between the voltage V1 and the voltage V2.

On the other hand, the comparison circuit 130 of the embodiment includes an operational amplifier OP2, a transistor M6 and a transistor M7. Specifically, in the embodiment, a negative input end of the operational amplifier OP2 in the comparison circuit 130 is coupled to the negative input end of the operational amplifier OP1 to receive the voltage V1. In addition, a positive input end of the operational amplifier OP2 receives a reference voltage Vref. As such, the operational amplifier OP2 compares the voltage V1 and the reference voltage Vref to generate a comparison result CP1.

On the other hand, a first end of the transistor M6 (for example, a source end) is coupled to the power voltage end VDD. A second end of the transistor M6 (for example, a drain end) is coupled to the positive input end of the operational amplifier OP2. A control end of the transistor M6 (for example, a gate end) receives the comparison result CP1, wherein the transistor M6 of the embodiment generates a current I1 according to the comparison result CP1. Moreover, the transistor M7 is serial connected between the positive input end of the operational amplifier OP2 and the reference ground end GND. In addition, the transistor M7 receives the current I1 provided by the transistor M6 to generate the reference voltage Vref, wherein the transistor M7 is a load LD in the comparison circuit 130. Also, the load LD is constructed by coupling a transistor of diode connection.

In the embodiment, a voltage regulator 140 includes transistors M8-M9, a reference current source Iref and a buffer A1. Specifically, the voltage regulator 140 is coupled between the comparison circuit 130 and the bandgap voltage generator 110. In addition, in the voltage regulator 140, a first end of the transistor M8 (for example, a source end) is coupled to the power voltage end VDD. A control end of the transistor M8 (for example, a gate end) is coupled to the output end of the operational amplifier OP2 to receive the comparison result CP1. A first end of the transistor M9 (for example, a source end) is coupled to the reference ground end GND. A second end of the transistor M9 (for example, a drain end) receives the bias voltage VB. Besides, the reference current source Iref is coupled between a second end of the transistor M8 (for example, a drain end) and the reference ground end GND to generate the reference current IR1. The reference current source Iref is used to draw the reference current IR1 from the drain end of the transistor M8. The buffer A1 is coupled between the second end of the transistor M8 and a control end of the transistor M9 (for example, a gate end), wherein the aforementioned buffer A1 may be a Schmitt trigger inverter, familiar to people skilled in the art. The transistors M6 and M8-M9 may be metal-oxide semiconductor field-effect transistors, and the transistor M7 may be a bipolar junction transistor. However, the embodiment of the invention is not limited thereto.

In detail, in the embodiment, an aspect ratio of channel sizes of the transistor M6 and the transistor M8 may be designed to be the same, such that the current I1 flowing through the transistor M6 and the current I2 flowing through the transistor M8 are substantially the same. Or, the aspect ratio of the channel sizes of the transistor M6 and the transistor M8 may be designed to be certain ratio, and a current value of the current I1 and the current I2 has certain ratio. It should be noted that, the input end of the buffer A1 of the embodiment receives the current difference of the current I2 and the reference current IR1. In addition, the buffer A1 generates a comparison result CP2 according to the current difference. Furthermore, when the voltage generating circuit 100 is operated in a start-up time interval, the voltage regulator 140 adjusts the voltage value of the bias voltage VB according to the comparison result CP2 generated by the buffer A1. For example, if a current value of the reference current IR1 is greater than that of the current I2, the buffer A1 provides the comparison result CP2 to conduct the transistor M8. Meanwhile, the voltage regulator 140 reduces the voltage value of the bias voltage VB according to the comparison result CP2, and thus increases the bandgap current IBG and the bandgap current IBG2 provided by the transistor M1 and the transistor M2. Contrarily, in a stable operation period after the start-up time interval, if the current value of the reference current IR1 is smaller than that of the current I2, the buffer A1 provides the comparison result CP2 so as to disconnect the transistor M8. At the same time, the transistor M1 and the transistor M2 generate the corresponding bandgap current IBG1 and the bandgap current IBG2 according to the bias voltage VB.

According to the above, in the embodiment, the voltage generating circuit 100 reduces the voltage value of the bias voltage VB output by the operational amplifier OP1 by using the voltage regulator 140 in the start-up circuit 120, such that the current values of the bandgap currents IBG1 and IBG2 are increased at the same time. As such, the voltage V1 of the negative input end and the voltage V2 of the positive input end of the operational amplifier OP1 are increased accordingly. The start-up failure led by low voltage of the voltage V1 and the voltage V2 is not occurred, and a stability and an accuracy of the bandgap voltage generator 110 are thus improved.

Figure 2:
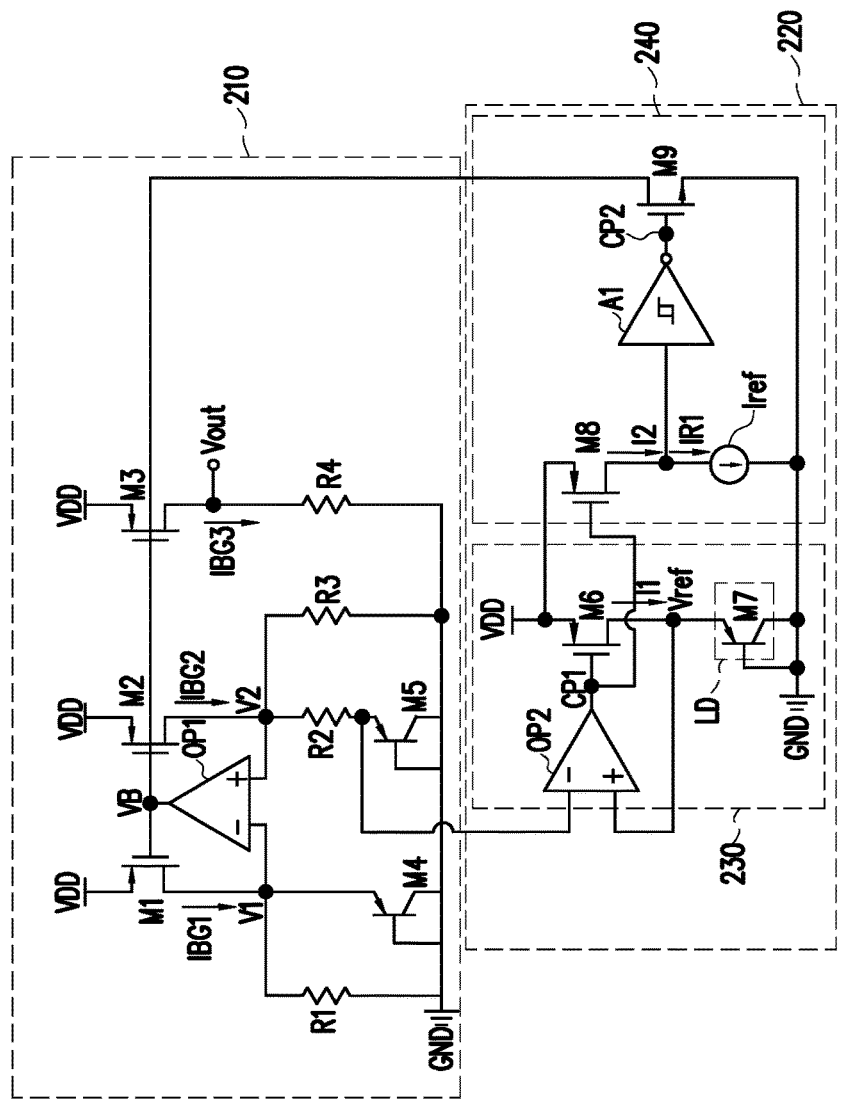
FIG. 2 is a circuit diagram of a voltage generating circuit according to another embodiment of the invention.

FIG. 2 is a circuit diagram of a voltage generating circuit according to another embodiment of the invention. A voltage generating circuit 200 includes a bandgap voltage generator 210 and a start-up circuit 220, wherein the start-up circuit 220 includes a comparison circuit 230 and a voltage regulator 240. It should be noted that, in the embodiment, the voltage generating circuit 200 is substantially the same as the voltage generating circuit 100, wherein the same or similar elements use the same or similar reference numerals. The difference is that, in FIG. 2, the negative input end of the operational amplifier OP2 is coupled to the emitter end of the transistor M5 to receive the voltage V2. In addition, the positive input end of the operational amplifier OP2 receives the reference voltage Vref similarly. As such, the operational amplifier OP2 compares the voltage V2 and the reference voltage Vref to generate the comparison result CP1. It should be noted that the related details of the embodiment of the voltage generating circuit 200 of the embodiment are the same or similar to the voltage generating circuit 100 of the previous embodiment. Explanations for the same technical contents will not be repeated in the following embodiments.

Figure 3:
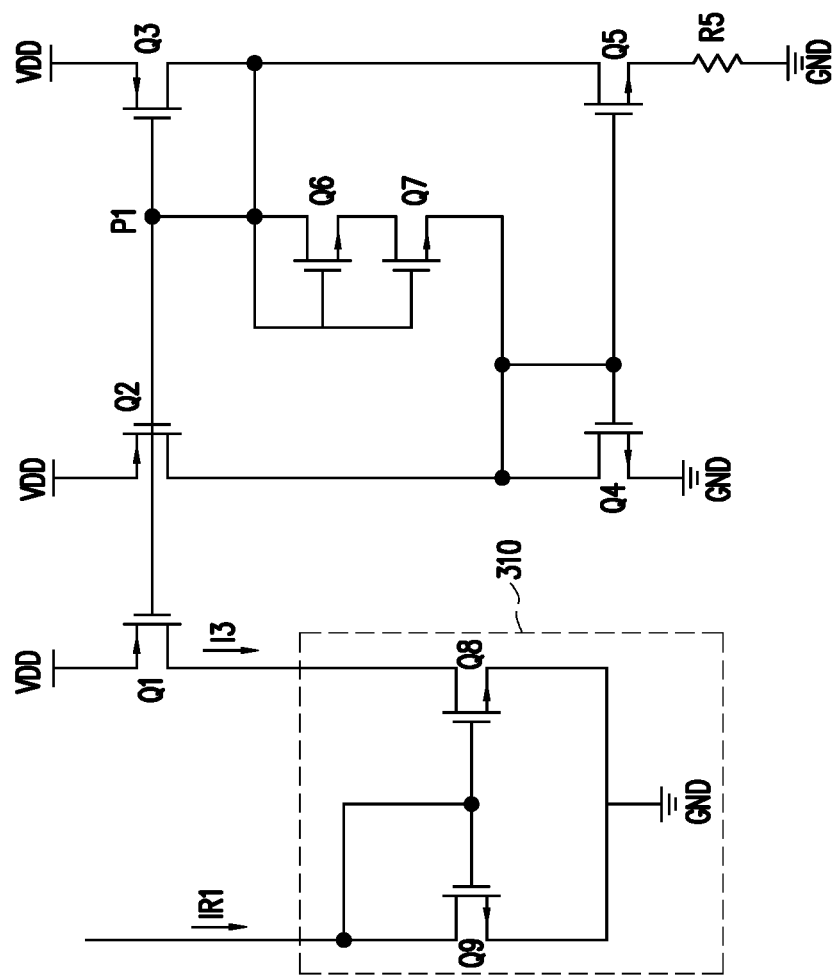
FIG. 3 illustrates a circuit diagram of the reference current source according to the embodiments of FIG. 1 and FIG. 2 of the invention.

FIG. 3 illustrates a circuit diagram of the reference current source according to the embodiments of FIG. 1 and FIG. 2 of the invention. In the embodiment, a reference current source 300 includes transistors Q1-Q9 and a resistor R5, wherein the transistor Q8 and the transistor Q9 form a current mirror circuit 310. Specifically, in the reference current source 300, the a end of the transistor Q1 (for example, a source end) is coupled to the power voltage end VDD. A control end of the transistor Q1 (for example, a gate end) is coupled to a node P1. In addition, the transistor Q1 generates a current I3 from the second end of the transistor Q1 (for example, a drain end) according a voltage on the node P1. A first end of the transistor Q2 (for example, a source end) is coupled to the power voltage end VDD. A control end of the transistor Q2 (for example, a gate end) is coupled to the node P1. A first end of the transistor Q3 (for example, a source end) is coupled to the power voltage end VDD. A second end (for example, a drain end) and a control end (for example, a gate end) of the transistor Q3 are coupled to the node P1. A first send of the transistor Q4 (for example, a source end) is coupled to reference ground end GND. A second end (for example, a drain end) and a control end (for example, a gate end) of the transistor Q4 are both coupled to the drain end of the transistor Q2. A second end of the transistor Q5 (for example, a drain end) is coupled to the drain end of the transistor Q3. A control end of the transistor Q5 (for example, a gate end) is coupled to a control end of the transistor Q4. Besides, the resistor R5 is coupled between a first end of the transistor Q5 (for example, a source end) and the reference ground end GND. A second end (for example, a gate end) and a control end (for example, a drain end) of the transistor Q6 are coupled to the node P1. A first end of the transistor Q7 (for example, a source end) is coupled to the drain end of the transistor Q2. A second end of the transistor Q7 (for example, a drain end) is coupled to a first end of the transistor Q6 (for example, a source end). A control end of the transistor Q7 (for example, a gate end) is coupled to the node P1.

On the other hand, in the current mirror circuit 310, a first end of the transistor Q8 (for example, a source end) is coupled to the reference ground end GND. A second end of the transistor Q8 (for example, a drain end) is coupled to the drain end of the transistor Q1 to receive the current I3. A first end of the transistor Q9 (for example, a source end) is coupled to the reference ground end GND. A second end (for example, a drain end) and a control end (for example, a gate end) of the transistor Q9 are both coupled to a control end of the transistor Q8 (for example, a gate end). It should be noted that the current mirror circuit 310 of the embodiment generates the reference current IR1 according to the current I3, wherein the aforementioned current mirror circuit 310 may be a current source current familiar to people skilled in the art. However, the embodiment of the invention is not limited thereto.

In addition, in the embodiment, the transistors Q1-Q3 may be P-type metal-oxide-semiconductor field-effect tran-sistors. The transistors Q4-Q9 may be N-type metal-oxide-semiconductor field-effect transistors. However, the embodiment of the invention is not limited thereto.

Surely, the reference current source 300 merely provides an exemplary embodiment of the reference current source of the embodiment of the invention. People skilled in the art may apply other kinds of current source circuit, which has constant-gm familiar to people skilled in the art, to the reference current source of the embodiment. No specific limitation is applied.

In summary of the above, the voltage generating circuit of the invention, by the voltage regulator in the start-up circuit, enhances the current value of the bandgap current by reducing the current value of the bias voltage during the activating process. As such, the voltage generating circuit of the invention enhances the voltage value on the positive input end and the negative input end of the operational amplifier, to ensure the stability and accuracy of the bandgap voltage generator in the voltage generating circuit.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A voltage generating circuit, comprising:
a bandgap voltage generator, having a first operational amplifier, the first operational amplifier receiving a first voltage and a second voltage, generating a bias voltage by comparing the first voltage and the second voltage, wherein the bandgap voltage generator generates a bandgap current according to the bias voltage and generates an output voltage according to the bandgap current; and
a start-up circuit, comprising:
 a comparison circuit, comparing the first voltage or the second voltage with a reference voltage to generate a first comparison result, and generating a first current according to the first comparison result, wherein the reference voltage is generated according to the first current; and
 a voltage regulator, coupled to the comparison circuit and the bandgap voltage generator, generating a second current according to the first current, comparing the second current and a reference current to generate a second comparison result, and adjusting voltage value of the bias voltage according to the second comparison result, wherein the voltage regulator comprises:
  a first transistor, where a first end of the first transistor is coupled to a power voltage end, a control end of the first transistor receives the first comparison result, wherein the first transistor generates the second current according to the first current;
  a second transistor, where a first end of the second transistor is coupled to a reference ground end, a second end of the second transistor receives the bias voltage;
  a reference current source, coupled between the second end of the first transistor and the reference ground end, generating a reference current, and drawing the reference current from the first transistor; and
  a buffer, coupled to the second end of the first transistor, receiving a current difference of the second current and the reference current, and generating the second comparison result according to the current difference, wherein the reference current source comprises:
a third transistor, where a first end of the third transistor is coupled to the power voltage end, a control end of the third transistor is coupled to a first node,
wherein a second end of the third transistor generates a third current according to a voltage on the first node;
a fourth transistor, where a first end of the fourth transistor is coupled to the power voltage end, and a control end of the fourth end is coupled to the first node;
a fifth transistor, where a first end of the fifth transistor is coupled to the power voltage end, and a second end and a control end of the fifth transistor are coupled to the first node;
a sixth transistor, where a first end of the sixth transistor is coupled to the reference ground end, a second end and a control end of the sixth transistor are coupled to a second end of the fourth transistor;
a seventh transistor, where a second end of the seventh transistor is coupled to the second end of the fifth transistor, a control end of the seventh transistor is coupled to the control end of the sixth transistor; and
a first resistor, coupled between the first end of the seventh transistor and the reference ground end.

2. The voltage generating circuit according to claim 1, wherein in a start-up time interval of the voltage generating circuit, the voltage regulator reduces voltage value of the bias voltage according to the second comparison result, and pulls up the bandgap current.

3. The voltage generating circuit according to claim 1, wherein the voltage regulator generates the second current according to the first comparison result, wherein the first current is in direct proportion to the second current.

4. The voltage generating circuit according to claim 1, wherein the bandgap voltage generator further comprises:
a first transistor, where a first end of the first transistor is coupled to a power voltage end, a second end of the first transistor is coupled to a negative input end of the first operational amplifier, and the first transistor is controlled by the bias voltage;
a second transistor, where a first end of the second transistor is coupled to the power voltage end, a second end of the second transistor is coupled to a positive input end of the first operational amplifier, and the second transistor is controlled by the bias voltage;
a third transistor, where a first end of the third transistor is coupled to the power voltage end, a second end of the third transistor receives the output voltage, and the third transistor is controlled by the bias voltage;
a first resistor, coupled between a negative input end of the first operational amplifier and a reference ground end;
a second resistor, where a first end of second resistor is coupled to the positive input end of the first operational amplifier;
a third resistor, coupled between the positive input end of the first operational amplifier and the reference ground end;
a fourth resistor, coupled between a second end of the third transistor and the reference ground end;
a fourth transistor, where a first end of the fourth transistor is coupled to the negative input end of the first operational amplifier, the second end and the control end of the fourth transistor are coupled to the reference ground end; and
a fifth transistor, where a first end of the fifth transistor is coupled to the second end of the second resistor, a second end and a control end of the fifth transistor are coupled to the reference ground end.

5. The voltage generating circuit according to claim 4, wherein the first transistor generates the bandgap current by the bias voltage, and the fourth transistor and the fifth transistor respectively generate the first voltage and the second voltage according to the bandgap current.

6. The voltage generating circuit according to claim 1, wherein the comparison circuit comprises:
a second operational amplifier, where a negative input end of the second operational amplifier is coupled to a negative input end or a positive input end of the first operational amplifier, a positive input end of the second operational amplifier receives the reference voltage, and an output end of the second operational amplifier generates the first comparison result;
a load, serial connected between the positive input end of the second operational amplifier and a reference ground end, receiving the first current to generate the reference voltage; and
a first transistor, where a first end of the first transistor is coupled to a power voltage end, a second end of the first transistor is coupled to the positive input end of the second operational amplifier, a control end of the first transistor receives the first comparison result, wherein the first transistor generates the first current according to the first comparison result.

7. The voltage generating circuit according to claim 1, wherein the buffer is a Schmitt trigger inverter.

8. The voltage generating circuit according to claim 1, wherein the reference current source further comprises:
a current mirror circuit, coupled between the second end of the third transistor and the reference ground end to receive the third current, and generating the reference current according to the third current.

9. The voltage generating circuit according to claim 1, wherein the reference current source further comprises:
an eighth transistor, where a second end and a control end of the eighth transistor are coupled to the first node;
a ninth transistor, where a first end of the ninth transistor is coupled to the second end of the fourth transistor, a second end of the ninth transistor is coupled to a first end of the eighth transistor, and a control end of the eight transistor is coupled to the first node.

* * * * *